US008645191B2

(12) United States Patent
Subramanian

(10) Patent No.: US 8,645,191 B2
(45) Date of Patent: Feb. 4, 2014

(54) PRODUCT PRICING OPTIMIZATION SYSTEM

(75) Inventor: Shivaram Subramanian, Eddington, ME (US)

(73) Assignee: Oracle International Corporation, Redwood Shores, CA (US)

( * ) Notice: Subject to any disclaimer, the term of this patent is extended or adjusted under 35 U.S.C. 154(b) by 281 days.

(21) Appl. No.: 12/987,549

(22) Filed: Jan. 10, 2011

(65) Prior Publication Data

US 2012/0130726 A1 May 24, 2012

Related U.S. Application Data

(60) Provisional application No. 61/415,129, filed on Nov. 18, 2010.

(51) Int. Cl.
*G06Q 10/00* (2012.01)
*G06Q 30/00* (2012.01)
*G06F 17/00* (2006.01)
*G06G 7/00* (2006.01)

(52) U.S. Cl.
USPC .......................................... 705/7.35; 705/400

(58) Field of Classification Search
USPC ................................. 705/7.35, 400
See application file for complete search history.

(56) References Cited

U.S. PATENT DOCUMENTS

| | | | |
|---|---|---|---|
| 7,328,164 B2 | 2/2008 | Krikler et al. | |
| 7,617,119 B1 | 11/2009 | Neal et al. | |
| 7,739,204 B1 | 6/2010 | Cranner et al. | |
| 2007/0027745 A1 | 2/2007 | Ouimet | |
| 2009/0210355 A1 | 8/2009 | Dagum et al. | |

OTHER PUBLICATIONS

Peter M. Guadagni and John D.C. Little., "A Logit Model of Brand Choice Calibrated on Scanner Data", Market Science, vol. 2, No. 3, Summer 1983, pp. 203-238.*
Hanssens et al., "Market Response Models and Marketing Practices", Appl. Stochastic Models Bus. Ind., 2005; 21:423-434.
Leeflang et al., "How Promotions Work: SCAN*PRO-Based Evolutionary Model Building", Schmalenbach Business Review, vol. 54, Jul. 2002.
Mond et al., "Nonlinear fractional programming". Bulletin of the Australian Mathematical Society, 12, pp. 391-397 (1975).
Sherali et al., "Reformulation-Linearization Methods for Global Optimization", Jun. 24, 2007, downloaded on Jan. 7, 2013 at: http://www.lix.polytechnique.fr/~liberti/rlt_encopt2.pdf.
Adjiman et al., "Global Optimization of Mixed-Integer Nonlinear Problems", AIChE Journal Sep. 2000 vol. 46, No. 9.
Dominique M. Hanssens et al.; "Market Response Models and Marketing Practice"; Applied Stochastic Models in Business and Industry; 2005; 21:423-434; published online in Wiley InterScience; www.interscience.wiley.com; DOI: 10.1002/asmb.584; Copyright © 2005 John Wiley & Sons, Ltd.

(Continued)

*Primary Examiner* — Allen J Jung
(74) *Attorney, Agent, or Firm* — Miles & Stockbridge P.C.

(57) ABSTRACT

A product pricing system determines a product price. The system receives product pricing constraints and multinomial logit ("MNL") calibration parameters. The system then generates a calibrated MNL model using the calibration parameters and encodes the MNL model and the product pricing constraints into a mixed-integer program ("MIP"). The system then solves the MIP to generate the product price.

16 Claims, 2 Drawing Sheets

(56) References Cited

OTHER PUBLICATIONS

Wedad Elmaghraby et al.; "Dynamic Pricing in the Presence of Inbentory Considerations: Research Overview, Current Practives, and Future Directions"; School of Industrial and Systems Engineering, Georgia Institute of Technology, Atlanta, Georgia 30332; Management Science © 2003 Informs, vol. 49, No. 10, Oct. 2003; pp. 1287-1309.

Peter M. Guadagni et al.,; "A Logit Model of Brand Choice Calibrated on Scanner Data*"; Marketing Science, vol. 2, No. 3, Summer 1983, printed in U.S.A.; copyright © 1983, The Institute of Management Sciences; pp. 203-238.

Y.K. Tse; "A Diagnostic Test for the Multinomial Logit Model"; Journal of Business & Economic Statistics; Apr. 1987; vol. 5 No. 2; pp. 283-286.

Ward Hanson et al.; "Optimizing Multinomial Logit Profit Functions"; Managment Science; vol. 42 No. 7; Jul. 1996; pp. 992-1003.

David J. Reibstein et al.; "Optimal Product Line Pricing: The Influence of Elasticities and Cross-Elasticities"; Journal of Marketing Research; vol. XXI; Aug. 1984; pp. 259-267.

* cited by examiner

PRODUCT PRICING OPTIMIZATION SYSTEM

RELATED APPLICATIONS

This application claims priority to U.S. Provisional Patent Application No. 61/415,129, filed Nov. 18, 2010, the specification of which is hereby incorporated by reference.

FIELD

One embodiment is directed generally to a computer system, and in particular to a computer system that optimizes product pricing.

BACKGROUND INFORMATION

Product line pricing is an important business problem faced by retailers and other sellers of merchandise who employ dynamic pricing strategies to generate incremental revenue benefits throughout the year. Retailers, among others, have in increasing numbers begun to utilize decision support systems that leverage the large volume of detailed demand data to automate and optimize pricing recommendations. In particular, the statistical modeling of the price elasticity of items based on analyzing the effect of price changes of one product on its demand, or the demand for another product, is a well-researched area.

Among known models that implicitly capture inter-item interactions, the multinomial logit ("MNL") model is a popular choice for discrete customer choice analysis, and has come into prominence for product line pricing in the retail industry. In this context, the market share of an item is a consequence of its relative attraction with respect to other competing items (i.e., substitutes). A retailer would like to determine an optimal category pricing strategy to set prices for items in a given category (e.g., soups, cold cereals) for the next few weeks. These items are assumed to be substitutable in that they compete for the same customer dollar. However, unlike the cross-elasticity model, the MNL model generally cannot capture the market halo effects associated with complementary items.

SUMMARY

One embodiment is a product pricing system that determines a product price. The system receives product pricing constraints and multinomial logit ("MNL") calibration parameters. The system then generates a calibrated MNL model using the calibration parameters and encodes the MNL model and the product pricing constraints into a mixed-integer program ("MIP"). The system then solves the MIP to generate the product price.

DETAILED DESCRIPTION

One embodiment is a product pricing optimization system that first models business and pricing rules as constraints. The model is then encoded into a mixed-integer program ("MIP") and then solved to generate the optimized pricing.

In one embodiment, a multinomial logit ("MNL") nonlinear optimization model is developed, which is recast as a discrete, nonlinear fractional program ("DNFP"). The DNFP model employs a bi-level, predictive modeling framework to manage the empirical effects of price elasticity and competition on sales and revenue, and to maximize the gross-margin of the demand group, while satisfying certain practical side-constraints. This model is then transformed by using the Reformulation-Linearization Technique ("RLT") in tandem with a sequential bound-tightening scheme to recover an MIP formulation having a relatively tight underlying linear programming relaxation, which can be effectively solved by known solvers. The solved MIP generates the optimized product pricing.

Figure 1:
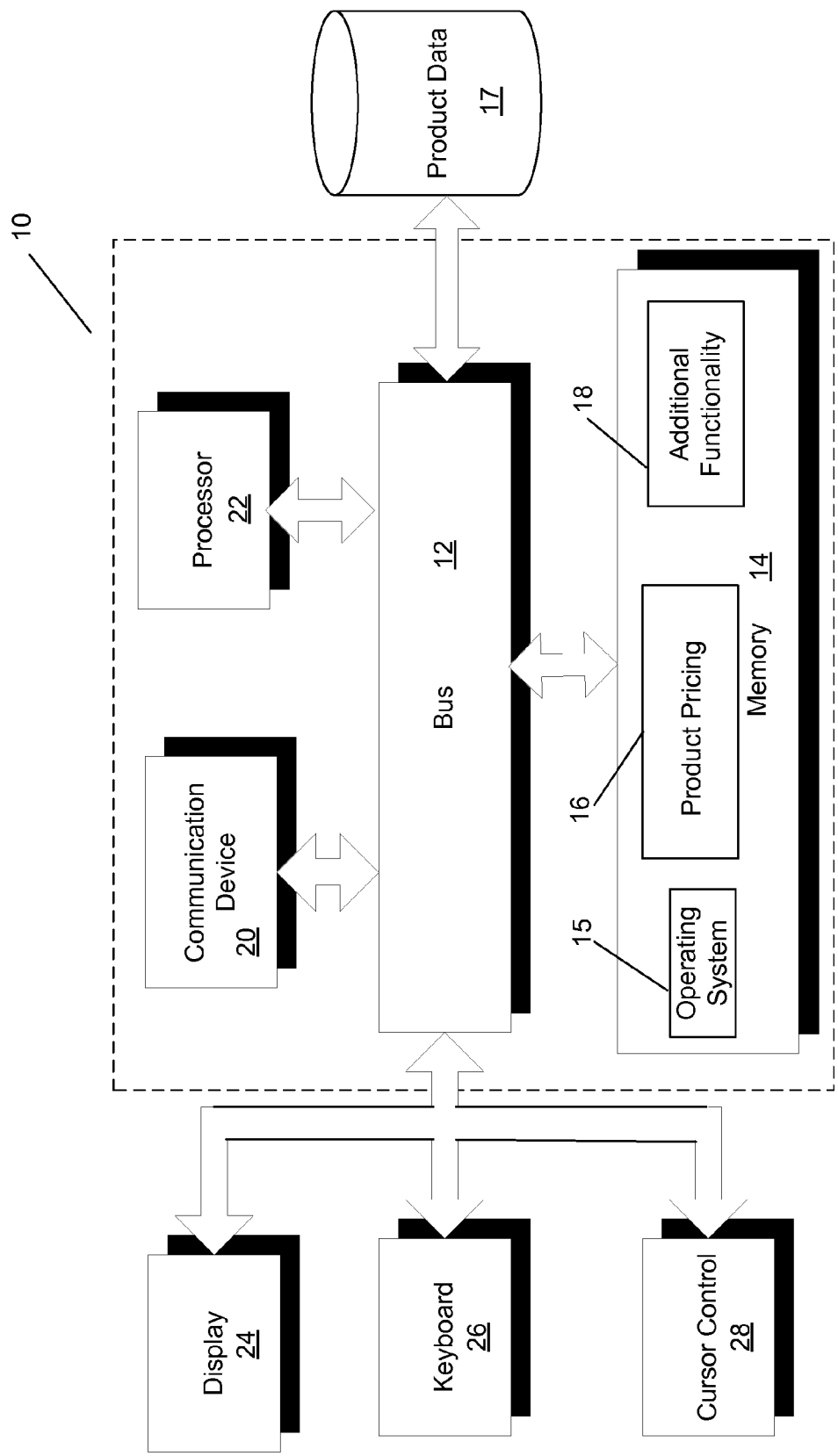
FIG. 1 is a block diagram of a computer system that can implement an embodiment of the present invention.

FIG. 1 is a block diagram of a computer system 10 that can implement an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a product pricing module 16 that generates optimized product pricing, as disclosed in more detail below. System 10 can be part of a larger system, such as an enterprise resource planning ("ERP") system. Therefore, system 10 will typically include one or more additional functional modules 18 to include the additional functionality. A database 17 is coupled to bus 12 to provide centralized storage for modules 16 and 18 and store pricing information, inventory information, etc.

In one embodiment, an MNL-based optimization model is developed for category pricing in the retail industry. However, in other embodiments this model can be used for any type of product pricing. For the retail embodiment, consider a retailer who has to set the baseline (or regular) price levels for some or all active items in a given category for the next few months, as part of a merchandise planning process. The category manager has to make multiple, coordinated pricing decisions, proactively taking into account the impact of a price change on the sales of other items within the category, as well as any (extraneous) market response. Moreover, the recommended prices have to satisfy several category-level objectives such as profitability, sales, and revenue (e.g., to maximize gross margin while ensuring that the total sales and revenue are within 10% of the current value), and have to be selected from within a limited discrete price ladder (e.g., be within 20% of the current price and end with '9' cents). In addition, items have to be priced relative to certain attributes such as brand type (e.g., a store brand tomato soup should be at least a dollar less than the price of the corresponding national brand), and quantity (e.g., a six-pack of diet-soda versus a two-liter bottle of diet-soda), among others.

Items can represent stock-keeping units ("SKU"s), product subclasses, or product classes within the category, depending on the level of aggregation in the merchandise hierarchy at which the analysis is performed by the category manager. For simplicity, it is assumed that prices of SKUs are optimized at the store-level of the location hierarchy. However, in other embodiments, the models can be readily extended to manage higher levels of aggregation (e.g., at the zonal level). Further, the models can address more general situations faced by category managers such as the need to jointly optimize multiple categories that are inter-linked by pricing constraints and/or objectives, or manage several distinct subsets of substitutable items within the same category.

Whereas MNL models can be used to predict market shares based on relative utilities or attractions, the overall sales of the demand group (or category) itself does not change. To overcome this shortcoming, in one embodiment, a second demand model for predicting category-level demands as a function of some representative price of the items in the category is used.

MNL Model

In one embodiment, an MNL nonlinear optimization model is used to represent the category pricing problem. The following notation is used in the model to represent MNL calibration parameters:

n=number of substitutable items in the category or demand group.
m=number of discrete price points or price levels per item.
P=set of points in the price ladder.
$d_i$=unit cost associated with item i.
$p_i^0$=initial (or original) price of item i.
$p_i$=recommended price for item i (principal decision variables). Note that $p_i$ can take on only one of certain pre-generated values (positive) $\bar{p}_{ij}$, j=1, ..., m, in the price ladder for item $\forall$i=1, ... n.

$$z_{ij} = \begin{cases} 1 & \text{if } p_i = \bar{p}_{ij} \\ 0 & \text{otherwise, } \forall j = 1, \ldots, m, \text{ for each } i = 1, \ldots, n. \end{cases}$$

(Binary Decision Variables).

($l_i$, $u_i$)=lower and upper bounds on the price for item i.
p, l, u=vectors having respective components $p_i$, $l_i$, $u_i$.
$\theta$=category-level sales (or demand) value (function of the variables $p_i$, as given by (1b) below).
$\theta_0$, $R_0$=category-level (initial) sales, and revenue value, respectively, obtained by fixing prices of items at the initial prices $p_i^0$, $\forall$i=1, ..., n.
$\psi$=price-elasticity parameter for category-level demand.

$U_i(p_i)$=deterministic component of the utility of item i (function of the variables $p_i$).
$\mu_i$, $\lambda_i$=coefficients used in the utility expression for item i: $U_i(p_i)=\mu_i+\lambda_i p_i$.
$e^{U_i(p_i)}$=measure of the attractiveness of item i to a consumer.

$$\frac{e^{U_i(p_i)}}{\sum_{i=1}^{n} e^{U_i(p_i)}} = \text{relative attractiveness measure of the } MNL\text{-predicted market}$$

share of item i within the category or demand group).

$\alpha$, $\beta$=coefficients used for setting category-level targets for sales, and revenue thresholds, respectively, which represent the respective threshold fractions of the initial sales and revenue values to be satisfied.
K=number of inter-item constraints. These constraints manage relative "price movements" within item pairs (e.g., to maintain a consistent price-brand relationship). $a_{i_k}$, $b_{i_k}$, $c_{i_k}$=inter-item constraint coefficients (involving items $i_k$ and $j_k$ for each k=1, ..., K).

$$v_{ij} = e^{U_i(\bar{p}_{ij})} = e^{\mu_i + \lambda_i \bar{p}_{ij}},$$

$$r_{ij} = v_{ij} \bar{p}_{ij}, \text{ and}$$

$$g_{ij} = r_{ij} - v_{ij} d_i = v_{ij}(\bar{p}_{ij} - d_i), \forall i=1, \ldots n, j=1, \ldots m.$$

The category pricing problem (i.e., MNL model) can then be recast as a discrete nonlinear fractional programming problem ("DNFP") given below:

$$DNFP: \text{Maximize } \frac{\sum_{i=1}^{n} \sum_{j=1}^{m} g_{ij} z_{ij}}{\sum_{i=1}^{n} \sum_{j=1}^{m} v_{ij} z_{ij}} \theta \quad (1a)$$

subject to:

$$\theta = \theta_0 \left( \prod_{i=1}^{n} \frac{p_i}{p_i^0} \right)^{\frac{\psi}{n}} \quad (1b)$$

$$\theta \geq \alpha \theta_0 \quad (1c)$$

$$\sum_{i=1}^{n} \sum_{j=1}^{m} r_{ij} z_{ij} \theta \geq (\beta R_0) \sum_{i=1}^{n} \sum_{j=1}^{m} v_{ij} z_{ij} \quad (1d)$$

$$a_{i_k} p_{i_k} \leq b_{j_k} p_{j_k} + c_k, \forall k = 1, \ldots, K \quad (1e)$$

$$\sum_{j=1}^{m} z_{ij} = 1, \forall i = 1, \ldots, n \quad (1f)$$

$$\sum_{j=1}^{m} \bar{p}_{ij} z_{ij} = p_i, \forall i = 1, \ldots, n \quad (1g)$$

z binary. $\quad (1h)$

The DNFP at (1a) above aims to determine the market share for each substitutive item in the category, while optimizing multiple objectives such as gross margin, sales, and revenue, and also considering the dynamic response of category-level sales to price changes and pricing rules. More specifically, it determines the price points in the price ladder for each item i that maximize the gross margin (1a) for the category. The objective function (1a) represents the sum of the market share-weighted item margins. The denominator in (1a) represents the sum of the MNL-based item-utility function values attained (based on the selected price points in the ladder), and is always positive-valued. The numerator in the ratio in (1a) represents the sum of the individual item profits realized ($\bar{p}_{ij} - d_i$) weighted by the corresponding utility function values ($v_{ij}$). Assuming that items are always priced more than their unit cost values ($l_i > d_i$, $\forall i=1, \ldots n$), then the numerator is also guaranteed to be positive-valued. Hence, the ratio yields the gross weighted profit per item, which is multiplied by the total category-level demand θ to compose (1a). The price effect on sales is captured using an empirical predictive model (1b) that attempts to explain the overall category sales as some nonlinear function of the geometric mean of the scaled prices of the items in the category based on an estimated value for the price elasticity parameter (ψ) for category-level sales. Constraint (1c) ensures that the sales for the category does not fall below a given percentage of the original sales value, while Constraint (1d) imposes a similar restriction on revenue. Constraint (1e) captures simple inter-item pricing rules between items $i_k$ and $j_k$, $\forall k=1, \ldots K$, as for example, rules that impose relative brand-price relationship, and Constraint (1f) selects a particular price from the designated price ladder for each item. Constraint (1g) identifies the price of each item based on the selected price point. These relationships can be used to substitute the $p_i$-variables out of the model formulation. Finally, Constraint (1 h) enforces the binary logical restrictions on the z-variables.

MIP Encoding

In one embodiment, the MNL model is encoded into a mixed-integer program ("MIP"). In one embodiment, the "Charnes and Cooper transformation", (disclosed in, for example, Charnes, A., and W. W. Cooper, "Programming with Fractional Functionals: I, Linear Fractional Programming", Systems Research Group, The Technological Institute, Northwestern University, ONR Research Memorandum No. 50 (1962)), is first applied to (1a) above, while retaining the binary restriction on the z-variables to transform DNFP into an equivalent semi-continuous problem. Toward this end, denote $$y \equiv \frac{\theta}{\sum_{i=1}^{n} \sum_{j=1}^{m} v_{ij} z_{ij}}, \quad (2a)$$

and $$\text{let } x_{ij} \equiv y z_{ij}, \forall i, j. \quad (2b)$$

Note that $v_{ij} x_{ij} \theta$ represents the market share of item i priced at $\bar{p}_{ij}$, while $v_{ij} x_{ij}$ represents the corresponding sales value. Next, the "Reformulation-Linearization Technique" ("RLT"), (disclosed in, for example, Sherali, H. D., and W. P. Adams, "A Reformulation-Linearization Technique for Solving Discrete and Continuous Nonconvex Problems", Kluwer Academic Publishers, Dordrecht/London/Boston (1999)) that, in effect, linearizes the resulting bilinear terms $yz_{ij}$ in the objective function after applying (2a), and provides an alternative representation for the semi-continuous variables $x_{ij}$ (which take on values of y or 0 by (2b) and (1h)). Accordingly, (1a, d, e, f) is multiplied by y (>0), but (1f, h) is also retained as well as the original constraints (1e) to tighten the underlying relaxation, while eliminating the $p_i$ variables using (1g). For conveniently representing (1b), the logarithms can be calculated (to the Naperian base e) in (1b) and introduced in the relationship $w \equiv \ln(\theta)$. Further, for enabling the linearization of (2b), the lower and upper bounds $y_{min}$ and $y_{max}$ are imposed on the variable y, which are readily derived using (2a) and (1f, h), for example. This yields the following equivalent retail price optimization program (RPO), where (3b) represents (2a); (3c, d, e) represent (1b, c) (where an implied upper bound $\theta_{max}$ on θ in (3i) is introduced with accompanying bounds on w for subsequently linearizing (3c)); (3f) represents (1d); (3g, h) represent (1e); and the remaining constraints (3i)-(3m) represent (1f, h) along with the RLT linearization of (2b). (It is recalled that (1g) has been used to eliminate the $p_i$-variables throughout the problem.)

$$RPO\text{: Maximize } \sum_{i=1}^{n} \sum_{j=1}^{m} g_{ij} x_{ij} \quad (3a)$$

subject to:

$$\sum_{i=1}^{n} \sum_{j=1}^{m} v_{ij} x_{ij} = \theta \quad (3b)$$

$$w = \ln(\theta) \quad (3c)$$

$$w = \ln(\theta_0) + \frac{\psi}{n} \sum_{i=1}^{n} \sum_{j=1}^{m} \ln\left(\frac{\bar{p}_{ij}}{p_i^0}\right) z_{ij} \quad (3d)$$

$$\alpha \theta_0 \leq \theta \leq \theta_{max}, \ln(\alpha \theta_0) \leq w \leq \ln(\theta_{max}). \quad (3e)$$

$$\sum_{i=1}^{n} \sum_{j=1}^{m} r_{ij} x_{ij} \geq \beta R_0 \quad (3f)$$

$$a_{i_k} \sum_{l=1}^{m} \bar{p}_{i_k l} z_{i_k l} \leq b_{j_k} \sum_{l=1}^{m} \bar{p}_{j_k l} z_{j_k l} + c_k, \forall k = 1, \ldots, K \quad (3g)$$

$$a_{i_k} \sum_{l=1}^{m} \bar{p}_{i_k l} x_{i_k l} \leq b_{j_k} \sum_{l=1}^{m} \bar{p}_{j_k l} x_{j_k l} + c_k y, \forall k = 1, \ldots, K \quad (3h)$$

$$\sum_{j=1}^{m} z_{ij} = 1, \forall i = 1, \ldots, n \quad (3i)$$

$$\sum_{j=1}^{m} x_{ij} = y, \forall i = 1, \ldots, n \quad (3j)$$

$$x_{ij} \leq y_{max} z_{ij}, \forall i = 1, \ldots, n, j = 1, \ldots, m \quad (3k)$$

$$x_{ij} \geq y_{min} z_{ij}, \forall i = 1, \ldots, n, j = 1, \ldots, m \quad (3l)$$

$$y_{min} \leq y \leq y_{max}, z_{ij} \text{ binary}, \forall i, j. \quad (3m)$$

In one embodiment, RPO is revised so it can be solved using off-the-shelf MIP packages, such as the "CPLEX" solver from IBM ILOG or the "Gurobi Optimizer". First, (3c) is linearized, i.e., $\theta = e^w$, over the bounded rectangular region (3e) by restricting θ to lie below an S-segment piecewise linear inner approximation to the convex function $e^w$ over the range $[\ln(\alpha \theta_0), \ln(\theta_{max})]$ (based on the restriction $\alpha \theta_0 \leq \theta \leq \theta_{max}$), as well as to lie above some T tangential supports to this function sampled at points $w_t$, $t=1, \ldots, T$, in the aforementioned range. This yields the following relationships that are used (henceforth) to replace Constraint (3c), where $\theta_t = e^{wt}, \forall t=1, \ldots T.$ $\theta \leq \text{PiecewiseLinear}(w, S)$ \hfill (4a)

$\theta \geq \theta_t[1+w-\log(\theta_t)], \forall t=1, \ldots T,$ where PiecewiseLinear (w, S) denotes the aforementioned S-segment upper-bounding piecewise linear approximation to $\theta = e^w$. In one experimental embodiment, the piecewise linear modeling capability available within IBM ILOG's "CONCERT" modeling language was used, where the resultant MIP model generated by CONCERT employs S auxiliary binary variables for the internal representation of PiecewiseLinear (w, S). A disclosure on the effect of experimenting with different values of S is below.

In one embodiment/implementation, the resulting optimal value of $\theta$ is primarily driven by the upper-bounding approximation. Consequently, one can set T=2, by providing tangential supports only at the end-points, $\ln(\alpha\theta_0)$ and $\ln(\theta_{max})$, respectively. However, in other embodiments/implementations, it is not guaranteed that the upper bounding approximation will always be active at optimality. Managers often add additional competitive price-matching constraints that tend to drive sales values of some items down if the corresponding competitor price is sufficiently high. Unprofitable items tend to have a similar effect on sales because of the margin-based objective (1a). On the other hand, some retailers may want to retain a limited inventory of "loss leaders" among these unprofitable items in their display shelves to induce in-store traffic. It is possible that a tradeoff resulting from a combination of such conditions can yield an optimal value of $\theta$ that lies strictly below the upper bounding functional.

Therefore, in one embodiment, in lieu of the piecewise linear approximation for $\theta$, an iterative process is used to determine a value of $\theta$ at which the corresponding (locally) optimal price values (nearly) satisfy (1b). In particular, when the structure of the empirical predictive model for category-level sales increases in complexity, such an iterative scheme may be the only practical choice available. Experimental analysis based on the category-level sales model (1b) indicated that the foregoing MIP formulation derived from the prescribed piecewise linear approximation for $\theta$ was computationally adequate for obtaining relatively quick, good quality solutions for RPO via commercial solver packages such as CPLEX.

In another embodiment, there is a need to derive a tight, valid bounding interval $[y_{min}, y_{max}]$ for the variable y. One way to determine an upper (lower) bound on y is via an optimal solution to the LP relaxation of RPO, but replacing the objective function with one that maximizes (minimizes) y. However, rather than relying solely on feasibility considerations, it would be advantageous to derive these bounds while also taking into account the effect of the objective function (3a). Therefore, in one embodiment, a good quality feasible solution to RPO having an objective function value V (e.g., using the node-zero analysis embedded within CPLEX) is heuristically obtained and then the valid inequality imposed:

$$\sum_{i=1}^{n}\sum_{j=1}^{m} g_{ij} x_{ij} \geq v \quad (5)$$

within (3), while maximizing (or minimizing) y. A complementary approach to determine a potentially tight upper bound value for y is to employ the arithmetic mean—geometric mean inequality on the relationship (2a) to get, noting (3i, m) and the definition of $v_{ij}$:

$$y = \frac{\theta/n}{\frac{1}{n}\sum_{i=1}^{n}\sum_{j=1}^{m} v_{ij} z_{ij}} \leq \frac{\theta/n}{\prod_{i=1}^{n}\left[\sum_{j=1}^{m} v_{ij} z_{ij}\right]^{\frac{1}{n}}} = \frac{\theta/n}{\left[\prod_{i=1}^{n} e^{\sum_{j=1}^{m} U_i(\bar{p}_{ij}) z_{ij}}\right]^{\frac{1}{n}}}, \quad (6)$$

and accordingly maximize the logarithm of the right-hand side of (6), i.e., noting (3c), $$\text{maximize}\left\{w - \frac{1}{n}\sum_{i=1}^{n}\sum_{j=1}^{m} U_i(\bar{p}_{ij}) z_{ij} - \ln(n)\right\}, \quad (7)$$

subject to the constraints of RPO. The most restrictive resultant interval [ymin, ymax] obtained from these approaches is used to generate RPO.

The underlying MNL model in (1) assumes that all the items in the demand group are substitutes. However, in some embodiments/implementations, customer data sets are encountered in practice that consist of several isolated demand subgroups (sub-categories), each of which contains items that are substitutable only by items within that sub-category. Allowing each such sub-category to be governed by its own statistically calibrated item-level MNL model, as well as its own sub-category-level demand model, helps improve the empirical performance of the overall predictive modeling framework. On the other hand, the items are required to have their prices jointly optimized across the group whenever items across subgroups are linked via the constraints of DNFP. Given the index set G of such subgroups, it can be shown that the following generalization (8a, b), where the following is substituted:

$$y_h = \frac{\theta_h}{\sum_{i=1}^{n}\sum_{j=1}^{m} v_{ij}^h z_{ij}}, \forall h = 1, \ldots, |G| \quad (8a)$$

and let $$x_{ij}^h = y_h z_{ij}^h, \forall h, i, j, \quad (8b)$$

can be employed to derive a linear objective function Z(G), given by:

$$\text{Maximize } Z(G) = \sum_{h=1}^{|G|}\sum_{i=1}^{n}\sum_{j=1}^{m} g_{ij}^h x_{ij}^h, \quad (8c)$$

where the x-, z- and y-variables, and the associated auxiliary coefficients are now identified by additionally indexing them based on their corresponding demand subgroup (h). Likewise, the corresponding side-constraints can be linearized to recover an MIP formulation similar to (3). The resulting MIP formulation can also be used to determine globally optimal pricing recommendations across several demand groups inter-linked by the constraints of the DNFP. These "superset" problem instances can involve several thousand pricing decision variables and inter-item pricing constraints, perhaps occurring in a block-diagonal pattern.

Figure 2:
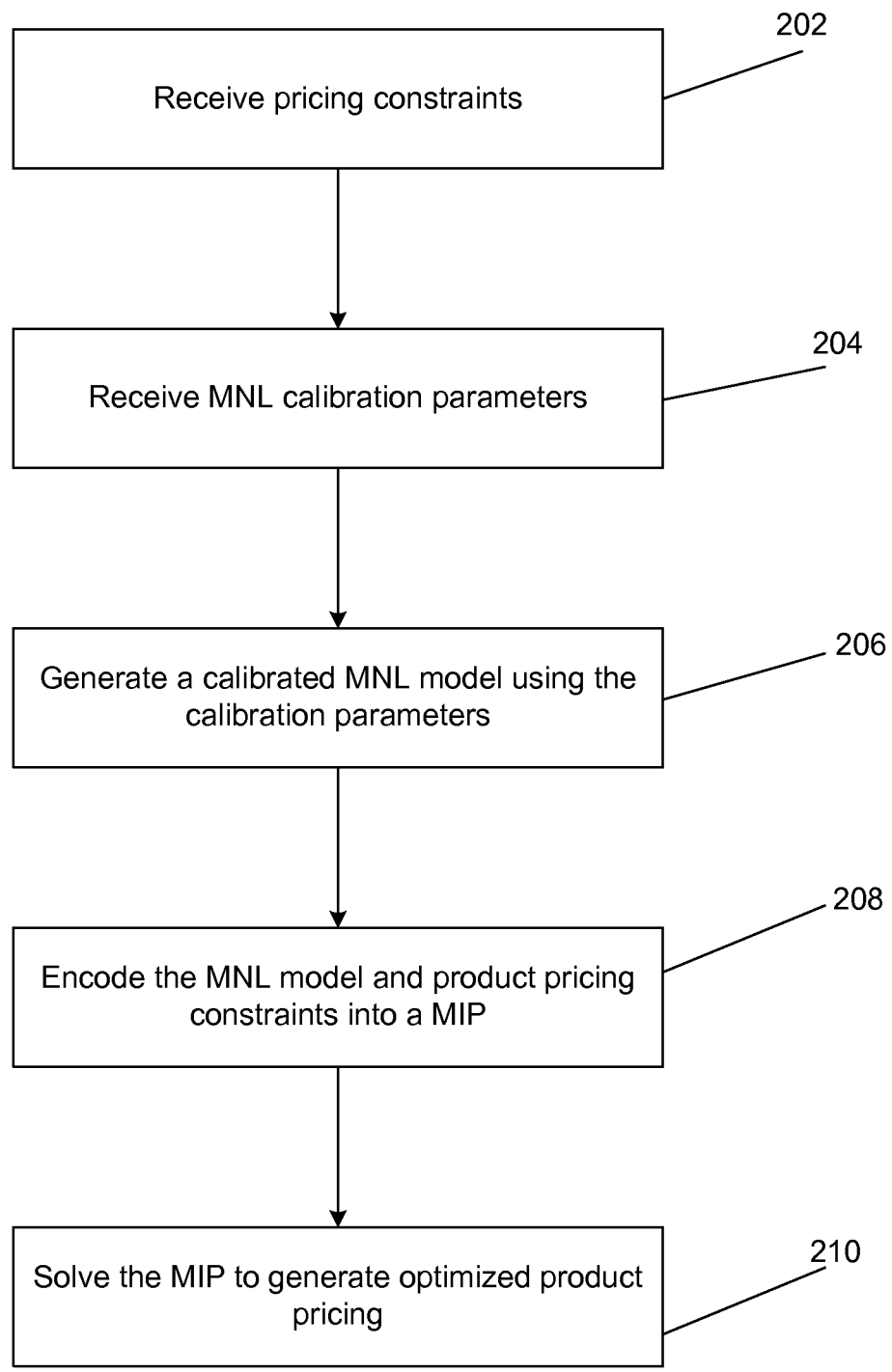
FIG. 2 is a flow diagram of the functionality of a product pricing module when generating optimized product pricing in accordance with one embodiment.

FIG. 2 is a flow diagram of the functionality of product pricing module 16 of FIG. 1 when generating optimized product pricing in accordance with one embodiment. In one embodiment, the functionality of the flow diagram of FIG. 2 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 202, business rules, metrics, objectives and other constraints (collectively referred to as pricing "constraints") are received. Examples of constraints include prices, margins, price change limits, competitor pricing, substitutable product pricing, thresholds, etc. Further, business requirements generally involve multiple objectives. A popular approach is to maximize gross margin for the product category while also ensuring that the recommended prices result in category level sales and revenue values that meet preset targets. These targets can be conveniently quantified relative to the corresponding metrics at the original or current prices. Other constraints include price limits, as well as inter-item pricing rules that constrain the prices of pairs of items (e.g., a store brand soup should be priced 50¢ less than the corresponding national brand). In addition, the prices are required to be competitive with respect to competitor prices, whenever such data is available. In some situations, the number of price changes that can be recommended is also limited.

At 204, MNL calibration parameters are received. The calibration parameters are used to set up the MNL model. If a higher (category level) elasticity model is used, as described below, a single additional elasticity parameter is received. The MNL model or the MNL-elasticity model combination describes how the sales of the items vary with the prices. The other input parameters include data such as item costs, current prices, business rules, and goals etc. These are added to provide directions on what constitutes a feasible (acceptable) pricing answer and also what the prices (and hence the sales levels) should be set to maximize the desired business goals (e.g., gross margin for the category, or total sales $ for the category, etc).

At 206, using the calibration parameters, an MNL nonlinear optimization model is generated. In one embodiment, a second high level price elasticity model is also used in conjunction with the MNL model in a bi-level empirical predictive framework.

At 208, the MNL model (and any other high level model) and the product pricing constraints are encoded/transformed into an MIP. In one embodiment, the MIP formulation is derived for optimizing an MNL model-based objective function in the presence of a discrete price ladder and other side-constraints, while also considering an extraneous competitive response to pricing. In one embodiment, the MNL model is first recast as a discrete, nonlinear fractional program ("DNFP"), and subsequently as an equivalent MIP. In one embodiment, the DFNP is transformed using the Reformulation-Linearization Technique ("RLT") in tandem with a sequential bound-tightening scheme.

At 210, the MIP is solved using known MIP solvers. In order to solve the MIP, in one embodiment the MIP is first linearized using a piecewise linear approximation for θ, or an iterative process is used to determine a value of θ. The solved MIP generates optimal product pricing.

Computational Tests and Results

In one embodiment, computational results are obtained using realistic, randomly generated instances of the RPO. For these tests, the following parameters are used:

Synthetic data sets were generated for varying sizes, initial prices, initial sales, costs, MNL utility coefficients, and constraint settings.

The category level price elasticity coefficient ($\psi$) was assumed to be $-2.0$.

The price ladder was generated using tables similar to the one shown below, while allowing a maximum variation of 30% from the original price value ($p^0$), and with the price points ending with the "magic number" 9 (cents). For example, an item that has to be priced between $45 and $55 will have the following price points: 45.49, 45.99, 46.49, 46.99, 47.49, 47.99, 48.49, 48.99, 49.49, 49.99, 50.99, 51.99, 52.99, 53.99, and 54.99.

| Ladder | Low Value ($) | High Value ($) | Increment (cents) |
|---|---|---|---|
| 1 | 0.00 | 9.99 | 10 |
| 2 | 10.00 | 49.99 | 50 |
| 3 | 50.00 | 99.99 | 100 |

The upper and lower bounds for θ were tightened and the piecewise linear interpolation was generated over the resultant interval using a value of S=9 (based on 10 uniformly spaced sample points, including the end points). In other embodiments, fewer interpolating points were used and comparative results for these instances are disclosed below.

The initial values for $y_{min}$ and $y_{max}$ were obtained as described in above. In all cases, the geometric mean-based value for $y_{max}$ was smaller than that obtained by maximizing y, subject to the constraints of the RPO.

The value for $y_{min}$ ($y_{max}$) was repeatedly tightened via LPs by minimizing (maximizing) y, while revising the constraints (3k)-(3m) based on the best lower and upper lower bounds currently available for y, until the improvement in the bounds between iterations was less than 5%. On average, this iterative procedure reduced the initial value of ($y_{max}$-$y_{min}$) by about 25%, and no more than two iterations were required in all cases.

Whenever feasible, a node-zero based analysis was employed to generate (5) and this constraint was incorporated within the foregoing sub-problems for minimizing and maximizing y so as to further restrict $y_{min}$ and $y_{max}$ based on optimality considerations. An assessment of the incremental value of accommodating (5) in this step is disclosed in computational results below.

All runs were made on a 3.0 GHz Pentium 4 processor PC having 2 GB of RAM. The LP and MIP solvers available in CPLEX 10.0 were used to solve the various optimization (sub-) problems. A limit of 2000 enumerated branch-and-bound nodes, and a relative optimality gap target of 5% were used.

Table 1 presents results for randomly generated instances of the RPO for different values of n as listed in Column 1. The corresponding number of bound-feasible price points (averaged over the n items) and the number of inter-item constraints generated are listed in the second and third columns, respectively. The optimal objective function value obtained for the LP relaxation of RPO is given in the fourth column, followed by the best feasible MIP objective function value achieved, in Column 5. The CPU seconds consumed by the overall approach is noted in Column 6, along with the number of branch-and-bound nodes enumerated (Column 7) and the relative optimality gap at termination (Column 8).

TABLE 1

Computational results for RPO.

| n | Avg. m | K | LP | MIP | Time (sec) | Nodes | Opt. Gap |
|---|---|---|---|---|---|---|---|
| 5 | 36 | 5 | 9066 | 8655 | 1 | 13 | 4.5% |
| 10 | 20 | 30 | 14572 | 14247 | 1 | 13 | 2.2% |
| 20 | 29 | 80 | 33467 | 31787 | 6 | 115 | 4.7% |
| 50 | 23 | 150 | 70889 | 68086 | 15 | 59 | 4.1% |
| 100 | 22 | 300 | 145382 | 143469 | 45 | 40 | 1.3% |
| 200 | 24 | 600 | 283522 | 270150 | 260 | 100 | 4.8% |
| 500 | 28 | 1500 | 783622 | 728660 | 1685 | 1000 | 4.9% |
| 1000 | 28 | 3000 | 1558868 | 1462010 | 7020 | 2000+ | 6.4% |

+Branch-and-bound node enumeration limit reached

Feasible solutions within the preset optimality tolerance of 5% were obtained for all but one instance using the MIP formulation in accordance with one embodiment. The optimal objective function value for the LP relaxation of the RPO was always within 8% of the best achieved MIP value. The preset branch-and-bound node enumeration limit of 2000 was reached only for the largest instance, when the optimality gap at termination was about 6.4%.

To examine the effect of (5) on the solution quality and efficiency via the derivation of tighter bounds on y, v is set equal to the best objective value found in Table 1 and (5) is added while minimizing and maximizing y. Table 2 analyzes the incremental impact of (5), with respect to the values presented in Table 1, on the achieved solution quality for a relative optimality tolerance target of 5%. For comparative purposes, the last column in Table 2 lists the best optimality gap achieved after reaching the preset node limit for each instance when a relatively tight optimality tolerance of 0.01% was used. On average, a significant increase (about 10%) in the value of $y_{min}$, and a relatively smaller reduction (less than 1%) in $y_{max}$ was observed.

TABLE 2

Computational results for RPO while using (5) to bound y.

| n | LP | MIP | Time (sec) (3% optimality tolerance) | Nodes | Opt. Gap | Opt. Gap (0.01% tol.) |
|---|---|---|---|---|---|---|
| 5 | 9046 | 8741 | 1 | 33 | 3.3% | 1.4% |
| 10 | 14563 | 14251 | 1 | 43 | 0.01% | 0.01% |
| 20 | 33467 | 31690 | 8 | 88 | 4.9% | 4.2% |
| 50 | 70884 | 68147 | 22 | 100 | 0.1% | 0.01% |
| 100 | 145338 | 143544 | 45 | 100 | 1.2% | 0.01% |
| 200 | 283204 | 271487 | 157 | 200 | 4.3% | 0.05% |
| 500 | 782005 | 729743 | 1456 | 753 | 0.3% | 0.1% |
| 1000 | 1557275 | 1464170 | 10805 | 1640 | 0.2% | 0.1% |

As can be seen in Table 2, when (3) is solved using the tighter bounds for y, the optimality gap at termination was significantly reduced for most instances in comparison with Table 1. The largest instance in Table 1 could now be solved to completion, yielding a solution within 0.2% of optimality. On the other hand, there is a relatively limited improvement in the 20-item instance in Table 2, and it was not possible to reduce the optimality gap below 4.2% even after setting the optimality tolerance to 0.01% and enumerating 2000 branch-and-bound nodes. However, using this tighter tolerance, all the other instances were solved to near-optimality (within 1.4%).

Note that it is possible to iteratively improve upon any incumbent feasible solution to (3) by employing the best achieved objective function value within (5) and repeating the aforementioned procedure until a solution is obtained within the desired level of optimality tolerance. In practice, a 5% optimality gap is generally acceptable, given the uncertain nature of the demand model parameters, among other factors.

Finally, the value of S was varied to analyze the overall effect of employing different degrees of approximation for the piecewise linear representation of θ. Table 3 presents computational results for S∈{1, 2, 4} (The results in Table 1 pertain to S=9).

TABLE 3

Computational results for RPO, for S = 4, 2, and 1.

| | S = 4 | | S = 2 | | S = 1 | |
|---|---|---|---|---|---|---|
| n | Time (sec) | Opt. Gap | Time (sec) | Opt. Gap | Time (sec) | Opt. Gap |
| 5 | 1 | 3.0% | 1 | 1.9% | 1 | 3.1% |
| 10 | 1 | 2.0% | 1 | 1.5% | 1 | 0.4% |
| 20 | 12 | 4.0% | 7 | 3.5% | 2 | 1.3% |
| 50 | 17 | 3.8% | 10 | 3.1% | 3 | 0.3% |
| 100 | 56 | 1.1% | 54 | 0.8% | 10 | 0.3% |
| 200 | 358 | 4.2% | 253 | 3.2% | 34 | 1.0% |
| 500 | 1678 | 4.9% | 1598 | 4.9% | 371 | 0.5% |
| 1000 | 6960 | 6.0% | 6480 | 5.5% | 3900 | 0.2% |

TABLE 4

Relative over-estimation (error) in category level sales for various S.

| n | S = 9 | S = 4 | S = 2 | S = 1 |
|---|---|---|---|---|
| 5 | 0.02% | 0.59% | 1.92% | 1.17% |
| 10 | 0% | 0.09% | 0.7% | 2.0% |
| 20 | 0.03% | 0.44% | 1.47% | 4.36% |
| 50 | 0.03% | 0.18% | 1.26% | 3.77% |
| 100 | 0.05% | 0.21% | 0.51% | 1.21% |
| 200 | 0.07% | 0.42% | 1.51% | 4.15% |
| 500 | 0.08% | 0% | 1.82% | 7.26% |
| 1000 | 0.04% | 0.35% | 0.85% | 7.19% |

TABLE 5

Optimal gross margin (1a) for various values of S.

| N | S = 9 | S = 4 | S = 2 | S = 1 |
|---|---|---|---|---|
| 5 | 8653 | 0.94% | 0.64% | 0.44% |
| 10 | 14247 | −0.04% | −0.01% | −0.11% |
| 20 | 31776 | 0.35% | −0.21% | −0.88% |
| 50 | 68064 | 0.13% | −0.27% | 0.03% |
| 100 | 143392 | 0% | 0% | −0.15% |
| 200 | 269967 | 0.31% | 0.12% | −0.13% |
| 500 | 728095 | −1.1% | −0.02% | −0.35% |
| 1000 | 1461380 | 0.18% | 0% | −0.94% |

The trend in the achieved optimality gap values across Tables 1 and 3 for a given instance of the RPO indicates a general improvement as S decreases. Furthermore, in most instances, a smaller value for S required relatively less CPU time to achieve a similar solution quality. For example, using a value of S=1 enabled the largest instance to also be solved within the desired optimality tolerance (in fact, the achieved objective function value for all instances was within 3.1% of optimality), while consuming a fraction of the CPU time used for the corresponding runs made for larger values of S. However, it is not guaranteed that a higher MIP objective function value obtained by using a smaller value for S will always translate into an equally improved value in the actual gross margin (1a) using the exact value of θ via (1b) for the prices obtained. Table 4 tracks the relative error between the piecewise linear estimate of θ (which was active at optimality in all test instances) and the true category-level sales (given by (1b)) for all instances presented in Tables 1 and 3, while Table 5 compares the trends in the recalculated (actual) gross margin values for these instances. The first column in Table 5 gives the actual gross margin dollars (i.e., the numerical objective function value) for S=9, and the remaining columns tabulate the relative percentage increase or decrease in the gross margin values for other values of S, with respect to the values in the first column.

The results presented in Table 4 indicate that the choice of S=9 resulted in a relative error of less than 0.08% for all instances, whereas using S=4 limited the corresponding error to within 0.6%. A value of S=2 corresponds to a two-segment piecewise linear approximation for θ, and this increased the relative error to between 0.7% and 2%. Setting a value of S=1 essentially seeks to represent Das a convex combination of its minimum and maximum values, thereby obviating the need for any additional binary variables to model the nonlinearity of Das a function of w. The corresponding over-estimation in the category sales value was relatively quite high in this case, and ranged between 1.1% and 7.3%.

Any apparent or real improvement in the gross-margin obtained by reducing the value of S has to be weighed against any possible degradation in the achieved values of the secondary objectives specified via the side-constraints. For example, when S was reduced from 9 to 4, the true gross margin value improved or remained the same in six of the eight instances and yielded a relatively favorable tradeoff as far as the primary objective is concerned, while a further reduction of the value of S to 2 resulted in a drop in the actual gross margin value in four instances (see Table 5). Finally, when S was reduced to 1, the improved MIP objective function values did not translate into a true improvement in most (six) of the instances, with only a marginal improvement in the other two instances. Whereas the values of S=2 and S=1 resulted in either an improved gross margin, or a relative reduction in gross margin value of less than 1% for all instances when compared to the corresponding values for S=9, the corresponding errors in any active side-constraints pertaining to sales, revenue, and CPI thresholds were relatively high (these results are not displayed for brevity). For example, the overestimation of the category sales value given in Table 4 is a direct measure of the achieved error in Constraint (1b). On the other hand, it is possible that a simple linear interpolation model for θ (using S=1) is acceptable for rapid 'ball-park' profitability assessments for typical real-life applications, especially when the user is mainly interested in getting a feel for the financial impact of allowing a limited number of pricing tweaks.

In one embodiment, instead of just the MNL model, a bi-level empirical predictive framework is used that includes a high-level price elasticity-based demand model, as well as a MNL-based market-share prediction model at the lower level. This is embedded within an optimization framework to formulate the discrete, nonlinear fractional program ("DNFP"), which is subsequently transformed/encoded into an equivalent MIP having a relatively tight underlying LP relaxation. In one embodiment, the high-level price elasticity-based demand model is the "SCAN*PRO" model, disclosed in, for example, Hanssens et al., "Market Response Models and Marketing Practices", Appl. Stochastic Models Bus. Ind., 2005; 21:423-434.

In other embodiments, the modeling and analysis of problems that consider alternative price-elasticity based demand structures occurring in multiple sub-groups can be solved. The disclosed mathematical models, with some minor modifications, can be extended to solve similar problems in other industries besides product pricing.

An example business use case would be to adjust prices to: maximize total predicted margin across the category such that: (a) total predicted volume (sales units) across category does not drop by more than 1%; (b) all recommended prices are within 10% of current price; (c) store brand items are always priced less than the corresponding national brand items (per ounce) (d) prices should always ends in .x9 cents, (e) . . . etc., where the predicted level of sales of any item depends on its own price as well as the prices of other items as specified by a calibrated MNL (+high-level elasticity) model.

As disclosed, a product pricing optimization system compiles pricing constraints and MNL calibration parameters and forms an MNL model. The MNL model and pricing constraints is encoded into a MIP, which can be solved to generate product pricing.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, causes the processor to determine a product price, the determining comprising:

receiving product pricing constraints;

receiving multinomial logit (MNL) calibration parameters;

generating a calibrated MNL model using the calibration parameters;

encoding the MNL model and the product pricing constraints into a mixed-integer program (MIP), wherein the encoding comprises recasting the MNL model as a discrete, nonlinear fractional program (DNFP); and solving the MIP to generate the product price.

2. The computer readable medium of claim 1, further comprising generating a bi-level empirical predictive framework that comprises a price elasticity-based demand model and the MNL model.

3. The computer readable medium of claim 2, wherein the price elasticity-based demand model is a SCAN*PRO model.

4. The computer readable medium of claim 1, wherein the encoding the MNL model further comprises transforming the DNFP using a Reformulation-Linearization Technique (RLT) in tandem with a sequential bound-tightening scheme.

5. The computer readable medium of claim 1, wherein the solving the MIP comprises linearizing the MIP using a piecewise linear approximation.

6. The computer readable medium of claim 1, wherein the solving the MIP comprises an iterative process.

7. The computer readable medium of claim 1, wherein the DFNP comprises:

$$DNFP: \text{Maximize} \frac{\sum_{i=1}^{n}\sum_{j=1}^{m} g_{ij}z_{ij}}{\sum_{i=1}^{n}\sum_{j=1}^{m} v_{ij}z_{ij}} \theta$$

subject to:

$$\theta = \theta_0 \left( \prod_{i=1}^{n} \frac{p_i}{p_i^0} \right)^{\frac{\psi}{n}}$$

$$\theta \geq \alpha\theta_0$$

$$\sum_{i=1}^{n}\sum_{j=1}^{m} r_{ij}z_{ij}\theta \geq (\beta R_0)\sum_{i=1}^{n}\sum_{j=1}^{m} v_{ij}z_{ij}$$

$$a_{i_k} p_{i_k} \leq b_{j_k} p_{j_k} + c_k, \forall k = 1, \ldots, K$$

$$\sum_{j=1}^{m} z_{ij} = 1, \forall i = 1, \ldots, n$$

$$\sum_{j=1}^{m} \bar{p}_{ij} z_{ij} = p_i, \forall i = 1, \ldots, n$$

$z$ binary.

8. The computer readable medium of claim 1, wherein the MIP comprises a retail price optimization program (RPO), and the RPO comprises:

$$RPO: \text{Maximize} \sum_{i=1}^{n}\sum_{j=1}^{m} g_{ij}x_{ij}$$

subject to:

$$\sum_{i=1}^{n}\sum_{j=1}^{m} v_{ij}x_{ij} = \theta$$

$$w = \ln(\theta)$$

$$w = \ln(\theta) + \frac{\psi}{n}\sum_{i=1}^{n}\sum_{j=1}^{m} \ln\left(\frac{\bar{p}_{ij}}{p_i^0}\right) z_{ij}$$

-continued $$\alpha\theta_0 \leq \theta \leq \theta_{max}, \ln(\alpha\theta_0) \leq w \leq \ln(\theta_{max}).$$

$$\sum_{i=1}^{n}\sum_{j=1}^{m} r_{ij}x_{ij} \geq \beta R_0$$

$$\sum_{j=1}^{m} z_{ij} = 1, \forall i = 1, \ldots, n$$

$$\sum_{j=1}^{m} x_{ij} = y, \forall i = 1, \ldots, n$$

$$x_{ij} \leq y_{max} z_{ij}, \forall i = 1, \ldots, n, j = 1, \ldots, m$$

$$x_{ij} \geq y_{min} z_{ij}, \forall i = 1, \ldots, n, j = 1, \ldots, m$$

$$y_{min} \leq y \leq y_{max}, z_{ij} \text{ binary}, \forall i, j.$$

9. A computer implemented method of determine a product price, the method comprising:
receiving product pricing constraints;
receiving multinomial logit (MNL) calibration parameters;
generating by a processor a calibrated MNL model using the calibration parameters;
encoding by the processor the MNL model and the product pricing constraints into a mixed-integer program (MIP)), wherein the encoding comprises recasting the MNL model as a discrete, nonlinear fractional program (DNFP); and
solving by the processor the MIP to generate the product price.

10. The computer implemented method of claim 9, wherein the encoding the MNL model further comprises transforming the DNFP using a Reformulation-Linearization Technique (RLT) in tandem with a sequential bound-tightening scheme.

11. The computer implemented method of claim 9, wherein the DFNP comprises:

$$DNFP: \text{Maximize} \frac{\sum_{i=1}^{n}\sum_{j=1}^{m} g_{ij}z_{ij}}{\sum_{i=1}^{n}\sum_{j=1}^{m} v_{ij}z_{ij}} \theta$$

subject to:

$$\theta = \theta_0 \left( \prod_{i=1}^{n} \frac{p_i}{p_i^0} \right)^{\frac{\psi}{n}}$$

$$\theta \geq \alpha\theta_0$$

$$\sum_{i=1}^{n}\sum_{j=1}^{m} r_{ij}z_{ij}\theta \geq (\beta R_0)\sum_{i=1}^{n}\sum_{j=1}^{m} v_{ij}z_{ij}$$

$$a_{i_k} p_{i_k} \leq b_{j_k} p_{j_k} + c_k, \forall k = 1, \ldots, K$$

$$\sum_{j=1}^{m} z_{ij} = 1, \forall i = 1, \ldots, n$$

$$\sum_{j=1}^{m} \bar{p}_{ij} z_{ij} = p_i, \forall i = 1, \ldots, n$$

$z$ binary.

12. The computer implemented method of claim 9, wherein the MIP comprises a retail price optimization program (RPO), and the RPO comprises:

$$RPO: \text{Maximize} \sum_{i=1}^{n}\sum_{j=1}^{m} g_{ij} x_{ij}$$

subject to:

$$\sum_{i=1}^{n}\sum_{j=1}^{m} v_{ij} x_{ij} = \theta$$

$$w = \ln(\theta)$$

$$w = \ln(\theta_0) + \frac{\psi}{n}\sum_{j=1}^{n}\sum_{j=1}^{m} \ln\left(\frac{\overline{p}_{ij}}{p_i^0}\right) z_{ij}$$

$$\alpha\theta_0 \leq \theta \leq \theta_{max},\ \ln(\alpha\theta_0) \leq w \leq \ln(\theta_{max}).$$

$$\sum_{i=1}^{n}\sum_{j=1}^{m} r_{ij} x_{ij} \geq \beta R_0$$

$$\sum_{j=1}^{m} z_{ij} = 1,\ \forall\ i = 1,\ldots, n$$

$$\sum_{j=1}^{m} x_{ij} = y,\ \forall\ i = 1,\ldots, n$$

$$x_{ij} \leq y_{max} z_{ij},\ \forall\ i = 1,\ldots, n,\ j = 1,\ldots, m$$

$$x_{ij} \geq y_{min} z_{ij},\ \forall\ i = 1,\ldots, n,\ j = 1,\ldots, m$$

$$y_{min} \leq y \leq y_{max},\ z_{ij}\ \text{binary},\ \forall\ i, j.$$

13. A product pricing system comprising:

a processor;

a memory coupled to the processor and storing instructions;

wherein the instructions, when executed by the processor, cause the processor to determine a product price comprising:

receiving product pricing constraints;

receiving multinomial logit (MNL) calibration parameters;

generating a calibrated MNL model using the calibration parameters;

encoding the MNL model and the product pricing constraints into a mixed-integer program (MIP), wherein the encoding comprises recasting the MNL model as a discrete, nonlinear fractional program (DNFP); and solving the MIP to generate the product price.

14. The system of claim 13, wherein the encoding the MNL model further comprises transforming the DNFP using a Reformulation-Linearization Technique (RLT) in tandem with a sequential bound-tightening scheme.

15. The system of claim 13, wherein the DFNP comprises:

$$DNFP: \text{Maximize}\ \frac{\sum_{i=1}^{n}\sum_{j=1}^{m} g_{ij} z_{ij}}{\sum_{i=1}^{n}\sum_{j=1}^{m} v_{ij} z_{ij}} \theta$$

subject to:

$$\theta = \theta_0 \left(\prod_{i=1}^{n} \frac{p_i}{p_i^0}\right)^{\frac{\psi}{n}}$$

$$\theta \geq \alpha\theta_0$$

$$\sum_{i=1}^{n}\sum_{j=1}^{m} r_{ij} z_{ij} \theta \geq (\beta R_0) \sum_{i=1}^{n}\sum_{j=1}^{m} v_{ij} z_{ij}$$

$$a_{i_k} p_{i_k} \leq b_{j_k} p_{j_k} + c_k,\ \forall\ k = 1,\ldots, K$$

$$\sum_{j=1}^{m} z_{ij} = 1,\ \forall\ i = 1,\ldots, n$$

$$\sum_{j=1}^{m} \overline{p}_{ij} z_{ij} = p_i,\ \forall\ i = 1,\ldots, n$$

$z$ binary.

16. The system of claim 13, wherein the MIP comprises a retail price optimization program (RPO), and the RPO comprises:

$$RPO: \text{Maximize} \sum_{i=1}^{n}\sum_{j=1}^{m} g_{ij} x_{ij}$$

subject to:

$$\sum_{i=1}^{n}\sum_{j=1}^{m} v_{ij} x_{ij} = \theta$$

$$w = \ln(\theta)$$

$$w = \ln(\theta_0) + \frac{\psi}{n}\sum_{i=1}^{n}\sum_{j=1}^{m} \ln\left(\frac{\overline{p}_{ij}}{p_i^0}\right) z_{ij}$$

$$\alpha\theta_0 \leq \theta \leq \theta_{max},\ \ln(\alpha\theta_0) \leq w \leq \ln(\theta_{max}).$$

$$\sum_{i=1}^{n}\sum_{j=1}^{m} r_{ij} x_{ij} \geq \beta R_0$$

$$\sum_{j=1}^{m} z_{ij} = 1,\ \forall\ i = 1,\ldots, n$$

$$\sum_{j=1}^{m} x_{ij} = y,\ \forall\ i = 1,\ldots, n$$

$$x_{ij} \leq y_{max} z_{ij},\ \forall\ i = 1,\ldots, n,\ j = 1,\ldots, m$$

$$x_{ij} \geq y_{min} z_{ij},\ \forall\ i = 1,\ldots, n,\ j = 1,\ldots, m$$

$$y_{min} \leq y \leq y_{max},\ z_{ij}\ \text{binary},\ \forall\ i, j.$$

* * * * *

UNITED STATES PATENT AND TRADEMARK OFFICE
CERTIFICATE OF CORRECTION

PATENT NO. : 8,645,191 B2
APPLICATION NO. : 12/987549
DATED : February 4, 2014
INVENTOR(S) : Subramanian Page 1 of 2

It is certified that error appears in the above-identified patent and that said Letters Patent is hereby corrected as shown below:

On Title page 2, column 1, item (56), under Other Publications, line 2, delete "Practives," and insert -- Practices --, therefor.

On Title page 2, column 2, item (56), under Other Publications, line 7, delete "Managment" and insert -- Management --, therefor.

In the Specification:

In column 4, line 20-21, delete "$b_{ik}$, $c_{ik}$" and insert -- $b_{jk}$, $c_k$ --, therefor.

In column 5, line 55, delete "$v_{ij}x_{ij}|\theta$" and insert -- $v_{ij} x_{ij}|\theta$ --, therefor.

In column 6, line 34, delete "$\ln(\alpha\theta_0) \leq w \leq \ln(\theta_{max})$." and insert -- $\ln(\alpha\theta_0) \leq w \leq \ln(\theta_{max})$ --, therefor.

In column 7, line 6, after "$\forall t=1, \ldots T,$" insert -- (4b) --.

In column 7, line 57, delete "V" and insert -- $v$ --, therefor.

In column 9, line 54, delete "DFNP" and insert -- DNFP --, therefor.

In column 13, line 21, delete "Das" and insert -- $\theta$ as --, therefor.

In column 13, line 24, delete "Das" and insert -- $\theta$ as --, therefor.

Signed and Sealed this
Twenty-fourth Day of June, 2014

Michelle K. Lee
*Deputy Director of the United States Patent and Trademark Office*

CERTIFICATE OF CORRECTION (continued)
U.S. Pat. No. 8,645,191 B2

In the Claims:

In column 14, line 37, in Claim 1, delete "causes" and insert -- cause --, therefor.

In column 15, line 2, in Claim 7, delete "DFNP" and insert -- DNFP --, therefor.

In column 16, line 2, in Claim 8, delete "$\ln(\alpha\theta_0) \leq w \leq \ln(\theta_{max})$." and insert -- $\ln(\alpha\theta_0) \leq w \leq \ln(\theta_{max})$ --, therefor.

In column 16, line 26, in Claim 9, delete "(MIP))," and insert -- (MIP), --, therefor.

In column 16, line 36, in Claim 11, delete "DFNP" and insert -- DNFP --, therefor.

In column 17, line 28, in Claim 12, delete "$\ln(\alpha\theta_0) \leq w \leq \ln(\theta_{max})$." and insert -- $\ln(\alpha\theta_0) \leq w \leq \ln(\theta_{max})$ --, therefor.

In column 18, line 1, in Claim 15, delete "DFNP" and insert -- DNFP --, therefor.

In column 18, line 50, in Claim 16, delete "$\ln(\alpha\theta_0) \leq w \leq \ln(\theta_{max})$." and insert -- $\ln(\alpha\theta_0) \leq w \leq \ln(\theta_{max})$ --, therefor.